2,926,595
COFFEE URN OR THE LIKE

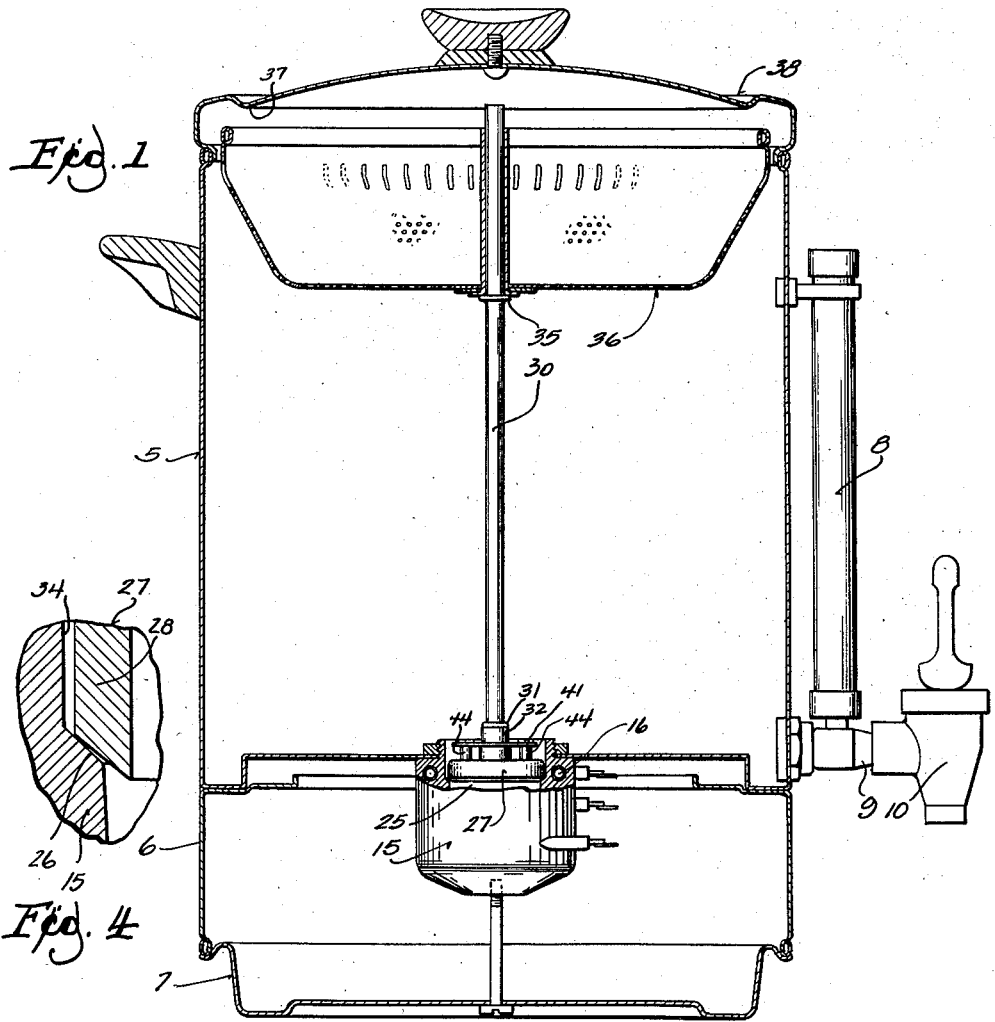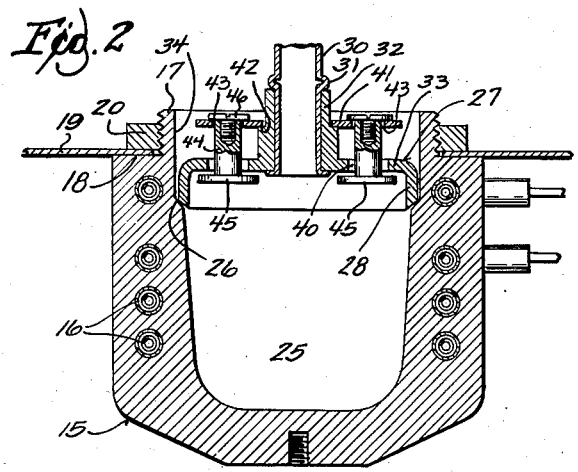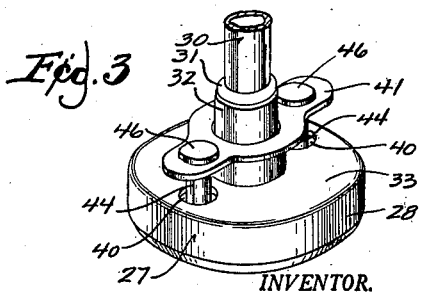
INVENTOR.
ALBERT G. HRON
BY
Wheeler, Wheeler + Wheeler
ATTORNEYS

United States Patent Office 2,926,595
Patented Mar. 1, 1960

Albert G. Hron, Kewaskum, Wis., assignor to Regal Ware, Inc., Kewaskum, Wis., a corporation of Wisconsin Application April 5, 1957, Serial No. 651,048

4 Claims. (Cl. 99—310)

This invention relates to a coffee urn or the like.

In large size coffee percolators, the range within which the percolator will function is frequently very limited because the head or back pressure of the liquid in the percolator tube or percolator stem increases relatively as the liquid level in the urn is reduced. Accordingly, a well-known commercial urn which will hold 72 cups of coffee will not percolate if the urn contains less than 36 cups of water to start.

The present device has an increased range of operation such that it will function properly if the amount of water in the urn at the start is 12 to 72 cups. This result is achieved partly by reason of the heating unit construction and partly by means of the heating unit closure and valving arrangement.

The improved device also uses the cover as a means of distributing the infusion liquid and discharging the bulk of it close to the side walls of the basket.

In the drawings:

Fig. 1 is a view in axial section through a percolating urn embodying the invention.

Fig. 2 is an enlarged detail view in which the heating unit closure and valve mechanism are shown in section.

Fig. 3 is a detail view in perspective showing the enclosure and the valve guide means mounted on the percolator tube.

Fig. 4 is an enlarged view of a portion of Fig. 2.

The construction of the urn 5 is, of course, broadly immaterial. As shown, it is provided with a hollow support 6 for the heating unit and a base 7 upon which the urn is mounted. The height of the liquid level within the urn is shown by sight glass 8 communicating at its lower end with the discharge spigot 9 controlled by valve 10.

The heating unit 15 comprises a thick walled casting of aluminum or the like in which the heating coil 16 is imbedded. The casting has a screw threaded neck portion 17 above a shoulder 18 which is engaged with the bottom 19 of the urn proper. The clamp nut 20 threaded to the neck engages the bottom of the urn to clamp the bottom wall 19 to shoulder 18 to provide a liquid-tight seal.

Within the heating unit 15 there is a large cavity at 25 to receive water from the urn. Well below the top of the heating unit there is an interior annular portion 26 engaged by the closure 27 which is in the form of an inverted thin walled cup having a depending skirt or flange 28 marginally beveled at an angle slightly different from that of the shoulder to seat with line contact. In practice, the shoulder is made at 45°, while the lower margin of the skirt or flange 28 is beveled at 40° so that the line contact is established near the outer surface of flange 28.

The percolator tube 30 has an annular bead at 31 seating on the upper end of a sleeve 32 which is unitary with the top wall 33 of closure 27. The external surface of the flange 28 is cylindrical and it fits rather closely into the counterbore 34 above the shoulder 26 of the heating unit. Another bead 35 spaced from the top of percolator tube 30 carries the basket 36 for the ground coffee. Water ejected upwardly through the percolator tube is distributed by cover 38, which has an annular rib at 37 for returning to the grounds near the rim of the basket all liquid which has not already fallen onto the coffee. It has been found very desirable that the infusion liquid should not be discharged into the center of the basket but should be discharged close to the side walls where its flow not only spreads through the coffee or other material in the basket but also tends to keep free the small slots or other openings with which the basket is provided and which would otherwise tend to become clogged by the coffee grounds.

The top wall 33 of the heating unit closure 27 is provided with one or more valve ports 40, two being illustrated. A valve guide 41 is centrally apertured and engaged over the sleeve 32 to rest on the shoulder 42 of that sleeve. The valve guide has valve stem guide apertures 43 centered over the respective ports 40. Reciprocable through the guide apertures 43 are the stems 44 of valves 45. Heads 46 at the upper ends of the respective stems engage the top surface of the guide plate 41 to limit the downward movement of the stems to a lower position in which the valves 45 are spaced below the top wall 33 of closure 27 by a fraction of an inch which, in practice, is about $1/16$ of an inch.

With the parts assembled as shown, water will flow through the valve ports 40 into the heating unit cavity 25 to substantially fill the cavity. However, regardless of the amount of water in the cavity, as soon as steam pressure develops, the valves 45 will be forced upwardly against the weight of the valves and their stems to close the ports 40 and thereupon the steam in the heating unit will eject from the percolator tube 30 the liquid standing therein, which liquid will be distributed over the ground coffee in the basket 36, excess liquid and the coffee extracted by the steeping operation being returned in the usual manner from the foraminous basket to the body of liquid in the urn.

As soon as steam pressure in the heating unit is relieved, the valves 45 are reopened to admit an additional charge of liquid into the heating unit, whereupon the operation will be repeated.

One of the merits of the device is the sturdiness of the parts and the ease with which the formed closure 27 and the percolator tube 30 upon which it is mounted can be washed. Also, it has been found that there is little or no tendency for particles of coffee to get caught between the valves and their seats and to interfere with proper operation, as so often happens in prior art devices. Steam generation and water circulation and infusion proceed rapidly and, as already noted, there is an unusually wide range of capacity within which the device will operate successfully.

I claim:

1. In a coffee urn having a coffee basket and a heating unit to deliver liquid to said basket, said heating unit provided with a seat, the combination with an inverted thin-walled cup-shaped closure having a downturned marginal flange removably engaged with the seat and provided with a percolator tube, the closure having a wall marginally connected to said flange and having within its margin a valve port opening through it into the heating unit, said percolator tube having a shoulder offset upwardly above said port and a valve guide mounted on the tube shoulder and projecting laterally over the port, a valve having a stem extending through the port and operatively guided by said guide, the valve being disposed beneath the wall of the closure and within the flange thereof, said valve being gravity biased downwardly to open said port, the valve being pressure operable upwardly against its gravity bias to close the port in response to pressure developed in the heating unit.

2. The device of claim 1 in which the valve guide comprises an apertured arm wherein the aperture is aligned with the port means and upwardly offset therefrom, the valve stem being reciprocable through the aperture and headed to limit valve opening movement.

3. The device of claim 1 in which the seat and the lower margin of the closure flange have beveled surfaces differing in angle and substantially in line contact.

4. The device of claim 3 in which the angle of the seat is approximately 45° and the angle of the lower margin of the flange is approximately 40°, whereby the line contact between the flange and the seat is adjacent the outer perimeter of the flange.

References Cited in the file of this patent

UNITED STATES PATENTS

| | | |
|---|---|---|
| 860,272 | Warner | July 16, 1907 |
| 988,268 | Holley | Mar. 28, 1911 |
| 1,132,472 | Hagearty | Mar. 16, 1915 |
| 1,257,110 | Pfirman | Feb. 19, 1918 |
| 1,743,342 | Halstead et al. | Jan. 14, 1930 |
| 1,916,228 | Lucia | July 4, 1933 |
| 2,213,723 | Smith | Sept. 3, 1940 |
| 2,704,506 | Kircher | Mar. 22, 1955 |
| 2,726,607 | Kircher | Dec. 13, 1955 |
| 2,730,610 | Farr et al. | Jan. 10, 1956 |
| 2,785,276 | Punzak | Mar. 12, 1957 |
| 2,817,743 | Foster | Dec. 24, 1957 |